United States Patent
Lahav et al.

(10) Patent No.: US 10,601,633 B2
(45) Date of Patent: *Mar. 24, 2020

(54) VIRTUAL WINDOW SCREEN RENDERINGS USING APPLICATION CONNECTORS

(71) Applicant: Blackberry Limited, Waterloo, Ontario (CA)

(72) Inventors: Amos Lahav, Tel Mond (IL); Ehud Lavin, Ra'anana (IL); Netzer Shlomai, Ra'anana (IL); Adi Ruppin, Los Altos, CA (US)

(73) Assignee: BlackBerry Limited, Waterloo (CA)

( * ) Notice: Subject to any disclaimer, the term of this patent is extended or adjusted under 35 U.S.C. 154(b) by 170 days.

This patent is subject to a terminal disclaimer.

(21) Appl. No.: 15/938,224

(22) Filed: Mar. 28, 2018

(65) Prior Publication Data

US 2018/0212815 A1 Jul. 26, 2018

Related U.S. Application Data

(63) Continuation of application No. 14/016,810, filed on Sep. 3, 2013, now Pat. No. 9,935,813, which is a continuation-in-part of application No. 13/720,093, filed on Dec. 19, 2012, now Pat. No. 9,342,329.

(60) Provisional application No. 61/696,553, filed on Sep. 4, 2012, provisional application No. 61/577,877, filed on Dec. 20, 2011.

(51) Int. Cl.
*H04L 29/08* (2006.01)
*G06F 9/451* (2018.01)

(52) U.S. Cl.
CPC ........ *H04L 29/08081* (2013.01); *G06F 9/452* (2018.02); *H04L 29/0809* (2013.01); *H04L 67/00* (2013.01); *H04L 67/02* (2013.01)

(58) Field of Classification Search
CPC ... H04L 29/08081; H04L 67/02; H04L 67/00; H04L 29/0809; G06F 9/452
See application file for complete search history.

(56) References Cited

U.S. PATENT DOCUMENTS

| | | | |
|---|---|---|---|
| 5,946,417 A | 8/1999 | Bonneau et al. | |
| 7,913,252 B2 | 3/2011 | Shlomai et al. | |
| 8,078,649 B2 | 12/2011 | Shlomai et al. | |
| 9,342,329 B2 | 5/2016 | Shlomai | |
| 2005/0125648 A1 | 6/2005 | Luciani et al. | |
| 2006/0136912 A1 | 6/2006 | Robinson et al. | |
| 2006/0249567 A1 | 11/2006 | Byrne et al. | |
| 2007/0094372 A1 | 4/2007 | Hariharan et al. | |

(Continued)

*Primary Examiner* — Benjamin C Wu
(74) *Attorney, Agent, or Firm* — Integral Intellectual Property Inc.; Amy Scouten; Miriam Paton

(57) ABSTRACT

A method and system for capturing and transmitting screen content and input/output events from a server to a client device are provided. The method includes transmitting, to the client device, a screen output rendered by the server respective of a first instance of a first application; and transmitting, to the client device, the screen output rendered by the server respective of a second instance of a second application, wherein the first instance is contained in a first securable object associated with the first application and the second instance is contained in a second securable object associated with the second application, wherein the first instance and the second instance are simultaneously executed by the server under a single logon session.

18 Claims, 8 Drawing Sheets

(56) References Cited

U.S. PATENT DOCUMENTS

| | | |
|---|---|---|
| 2008/0016155 A1 | 1/2008 | Khalatian |
| 2009/0254899 A1 | 10/2009 | Shlomai et al. |
| 2010/0094838 A1 | 4/2010 | Kozak |
| 2011/0269508 A1 | 11/2011 | Libault et al. |
| 2012/0066333 A1 | 3/2012 | Browning et al. |
| 2012/0084713 A1 | 4/2012 | Desai et al. |
| 2018/0159896 A1* | 6/2018 | Soman .................... H04L 63/10 |
| 2018/0211036 A1* | 7/2018 | Zlotnik ............... H04L 63/1416 |
| 2019/0303354 A1* | 10/2019 | Zamir ................. G06F 16/1844 |

* cited by examiner

VIRTUAL WINDOW SCREEN RENDERINGS USING APPLICATION CONNECTORS

TECHNICAL FIELD

The present invention relates generally to application virtualization, and more particularly to display of virtualized application over a remote device.

BACKGROUND

Personal computers (PCs) traditionally have been used to execute a multitude of software applications, features and functions. The applications provide the user with tools to accomplish tasks, such as, but not limited to, document processing, spreadsheet management, email exchanges, and Internet browsing. These applications are executed over an operating system installed in the PC. Previously, there were only a limited number of operating systems available for PCs, for example, Windows®, MAC OS®, and Linux®, which are the predominant operating systems.

However, recently the popularity of newly developed operating systems (e.g., iOS™ by Apple®, Android™ by Google®, Chrome OS™, and the like) has significantly increased. Such operating systems have been developed to be mainly installed in handled computing devices, such as smart phones, tablet computers, and the like. These devices are also capable of executing software applications (known as APPs) over the operating system of the device.

Software applications, regardless of the type of operating system, are installed and set up using an automated installation process. The installation process is designed to enable the integration of the new functionality to the operating system, as well as to ensure that the application can be removed.

Virtualization technology allows executing virtual applications inside an isolated virtual environment having its own virtual file system and virtual registry. That is, execution of a virtual application will not conflict or impact other virtual applications that may coexist in the virtual environment.

Typically, an operating system operable in PCs, such as Microsoft® XP®, Microsoft Vista®, or Microsoft® Windows 7, includes a registry file for storing an operating system, user, and application settings, dynamic link libraries (DLLs) which contain shared code, and named objects for naming functions shared by different processes. However, this structure of an operating system is incompatible with other types of operating systems designed for execution of handled devices.

For example, the Android™ OS is based on the Linux® OS kernel for core system services such as security, memory management, process management, network stack, and driver model. The kernel also acts as an abstraction layer between the hardware and upper layers of the Android™ OS. These layers include a set of C/C++ libraries used by various components of the Android™ OS, a runtime, and an application framework that provides an interface between the applications and the operating system's functions. As a result, an application, e.g., Microsoft Office Word™ 2010, developed for Windows-based operating systems, cannot be executed over Android™ OS. This limits the user to a set of applications developed specifically for a certain type of operating system. That is, a user of a smart phone equipped with an Android™ OS is limited to access and run only applications developed for this type of an operating system.

In addition, a PC's operating system operates in conjunction with the file system of the PC. For example, a new technology file system (NTFS) is the standard file system for Windows XP®, Windows Server® 2003, Windows Server® 2008, Windows Vista®, and Windows® 7 operating systems. Handled computing devices do not implement an NTFS and their operating systems often do not support this file system. Thus, files cannot be saved in a structure of folders and sub-folders, such as those provided by the NTFS. In most cases, users of handled computing devices rely on cloud storage services, e.g., Dropbox™, Box.net, and the like, to store their data files.

One technique that allows for the execution of a software application across different operating systems includes: executing a cloudified application corresponding to the software application upon launching a mobile application on a computing device compliant with a second type of operating system; receiving inputs generated by the mobile application; rendering outputs based in part on the received inputs; and streaming the rendered output to the computing device to be displayed by the mobile application. The technique allows for execution even when the first OS and second OS are incompatible with each other, for example, the first OS is a Windows-based OS, while the while second OS is a non-based Windows OS (e.g., Android™). An example for such a technique is disclosed in the above-referenced patent application Ser. No. 13/720,093, assigned to the common assignee and herein incorporated by reference in its entirety.

FIG. 1 shows a diagram illustrating a system 100 useful in describing the software application across different operating systems. In the system 100, a plurality of servers 110-1 to 110-N can be accessed by a computing device 120 through a network connection 130. Each of the plurality of servers 110-1 to 110-N allows the execution of software applications across different types of operating systems. The computing device 120 is typically a handled computing device including, for example, a smart phone, a tablet computer, a PDA, and the like that runs an OS that is not a Windows-based OS. The computing device 120 runs an operating system that may be any one of, for example, iOS®, Android™, Chrome OS™, and the like.

Typically, the servers 110-1 to 110-N are deployed in one or more datacenters that can provide cloud computing services. In the system 100, the computing device 120 can execute legacy applications, which are software applications designed to be compliant with Windows-based operating systems. Examples for such legacy applications include the various versions of Microsoft Office® Word, Excel, Power Point, Outlook, Visio, Publisher, and the like, as well as Microsoft Internet Explorer®, Flash® applications, Java® applications, Silverlight® applications, numerous in-house legacy applications that were all developed only for Windows and are too costly or not feasible to re-write for other operating systems, and so on. Software applications executed on mobile compatible operating systems, such as iOS®, Android™, and Chrome OS™ will be also referred hereinafter as "mobile applications". Typically, such applications are downloaded from a marketplace of the operation system's provider, e.g., Android Market and Apple Store. The servers 110-1 to 110-N are configured to execute a virtualized cloud version of a legacy application, referred to as "cloudified applications".

A mobile application is downloaded from the marketplace of the operation system's provider and displayed as a mobile application icon on a display of the computing device 120. The mobile application is related to the legacy application (hence the cloudified application) to be executed. The user by clicking on the icon causes execution of the application to launch on the device 120. As a result, the user will enjoy the full functionality of the legacy application while executed as a mobile application on the device 120. In the system 100, a cloudified application corresponding to the legacy application is executed by one or more of the servers 110-1 to 110-N, where rendered outputs are streamed to the computing device 120, over the network 130, by means of, for example, HTTP. For the user, it appears that the legacy application is actually executed by the device 120.

As an example, the legacy application Microsoft Office Word 2010™ is executed on a tablet computer. As shown in FIG. 2A, an icon 210 of the Word mobile application is placed on the tablet's display 200, such as with any other mobile application. As shown in FIG. 2B, tapping on the icon 210 causes the device to launch the Word application. As can be noticed, the user interface and the functionality are as if a Word application has been executed on a PC running a Windows-based OS. The user can open, review, edit, and save a document.

Returning back to FIG. 1, a server 110-$i$ (i=1 to N) hosts a cloudified application version of the Word application, and every input from the device is communicated to the server 110-$i$. The captured inputs include, for example, location of the cursor, any character typed using the keypad, a selection of a task from the toolbar (e.g., opening a file, changing font size, color, applying track change options), and so on. The server 110-$i$ processes the received input and renders a new output display that is communicated to the tablet computer. For example, as shown in FIG. 2C, upon selection by a user to open a document, a dialog box is displayed to the user.

Standard techniques for capturing changes in the screens and sending such changes from a server to a client are based on terminal services (TS) and a remote desktop protocol (RDP). As shown in FIG. 3, applications use standard Application Programming Interfaces (API), such as Graphics Device Interface (GDI) 400, User32 405 and DirectX 410 to transmit the information displayed on the screen of the computer 415. These APIs interact with a kernel 420 of the operating system that passes the information to the screen driver 425 using TS 430. Similarly, I/O events, such as keyboard and mouse events, are sent back to the application through mouse and keyboard drivers 435. The TS module 430 is located between the kernel 420 and the computer's drivers 425, 435. The capturing screens and I/O events are performed by the TS module 430.

Generally, Windows-based OS provides objects managed using Windows Stations and Desktops, which are each securable objects. A Windows Station is a securable object associated with a process, and it contains a clipboard, an atom table, and at least one desktop object. A Windows desktop is a securable object contained within a Windows Station. A desktop has a logical display surface and contains user interface objects, such as windows, menus, and hooks. For example, the desktop can only be used to create and manage windows.

Windows objects exist within Windows Sessions, with each session consisting of all processes and other objects that represent a single user's logon session. This includes windows, Desktops, and Windows Stations. Each session can contain more than one Windows Station and each Windows Station can have more than one desktop. However, at any given time, only one Windows Station is permitted to interact with the user at the console. This is called Winsta0, which contains three desktops, winlogon, default, and disconnect, corresponding to the logon screen, the user desktop, and the disconnect desktop. All three have separate logical displays, so when a user locks a screen, for example, the default desktop disappears and the winlogon desktop appears instead.

The conventional approach for capturing and transmitting screens and I/O events suffers from various limitations. For example, to transmit multiple applications to multiple users from a single server, each user must have his own Windows session, which is resource intensive. To overcome this limitation, multiple Window Stations can be executed under the same Windows Session. Theoretically, two applications can run in two different Windows Stations and be transmitted to a user concurrently. However, this cannot be performed directly, as there can be only a single Interactive Window Station (Winsta0) in the OS. All other Window Stations (such as Services) are non-interactive and cannot have a graphic communication with the user.

Another potential technique for transmitting multiple applications to multiple users from a single server includes opening multiple Windows Desktops in a single Window Station. In a Windows XP® OS, for example, the Interactive Window Station (Winsta0) includes three Desktops: WinLogon, a default (regular) desktop, and Disconnect. Theoretically, multiple Desktops in WinSta0 can be created and an application can be opened in each one of the Desktops and transmitted concurrently. However, this cannot be achieved since at any given time there can only be one Interactive Desktop, and all desktops are separate logical displays, only one of which is available at any given time.

Furthermore, when two applications are opened, they are in the default Desktop. It would be beneficial to transmit each one of them separately, regardless of which window is top-most. As shown in FIG. 4, when two application windows, 450, 455 are opened, one over the other, both cannot be transmitted as two separate windows. That is, there is no way to transmit windows of two or more applications at the same time, because the screen driver can only show the top window. In the exemplary diagram provided in FIG. 4, the top application window 450 and only a portion of the application window 455 are displayed.

Therefore, it would be advantageous to provide an efficient solution to overcome the shortcomings of currently available techniques for capturing and transmitting screens and I/O events.

SUMMARY

Certain embodiments disclosed herein include a method and system for capturing and transmitting screen content and input/output events from a server to a client device. The method comprises transmitting, to the client device, a screen output rendered by the server respective of a first instance of a first application; and transmitting, to the client device, the screen output rendered by the server respective of a second instance of a second application, wherein the first instance is contained in a first securable object associated with the first application and the second instance is contained in a second securable object associated with the second application, wherein the first instance and the second instance are simultaneously executed by the server under a single logon session.

BRIEF DESCRIPTION OF THE DRAWINGS

The subject matter disclosed herein is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
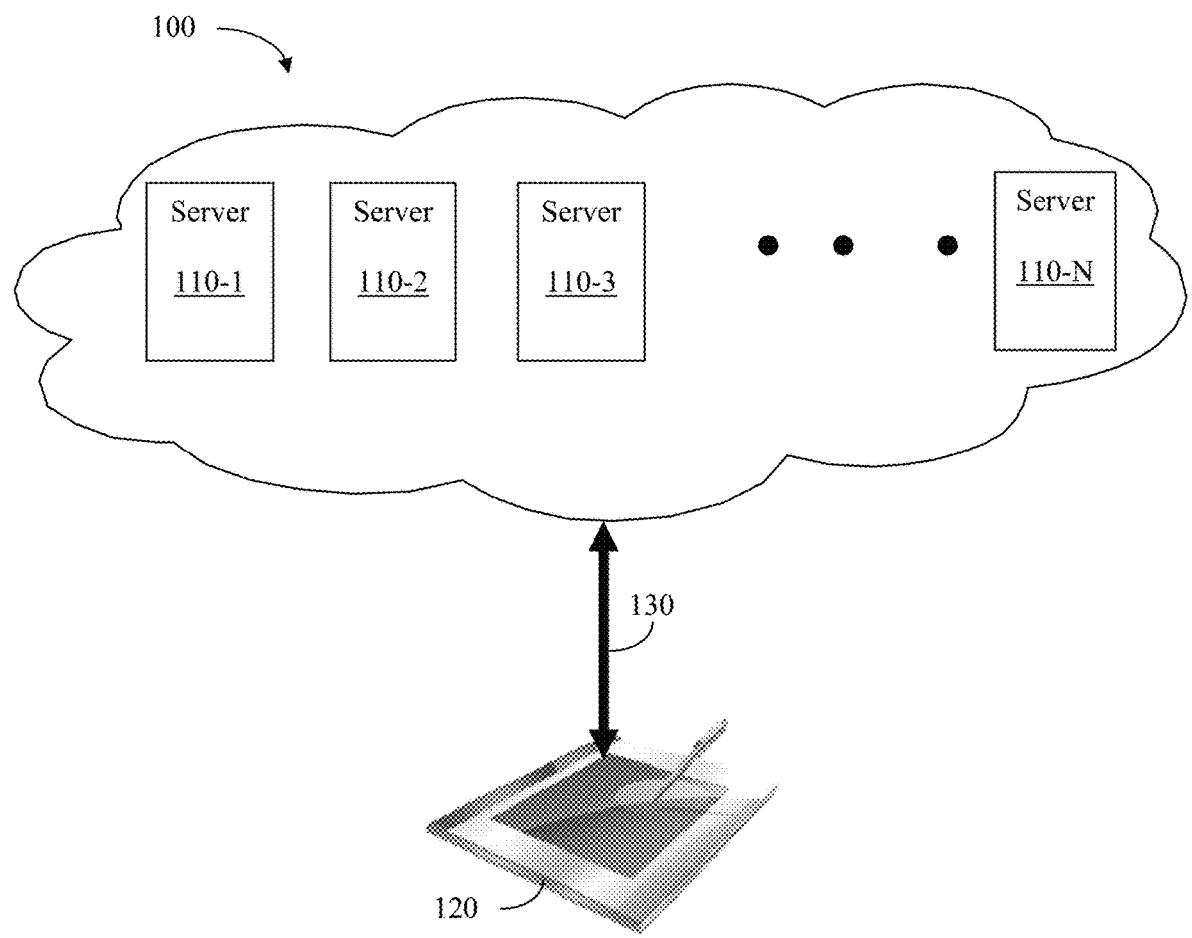
FIG. 1 is a diagram illustrating a computer network system.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein are designed to overcome the shortcomings of currently available techniques for capturing and transmitting screens and I/O events from a server to a client device. In one embodiment, a virtual screen capturing method includes running multiple applications of multiple users in two or more different non-interactive stations, such as Windows Stations. Each Windows Station contains a clipboard, an atom table, and one or more desktop objects. Each Windows Station is a securable object. When a Windows Station is created, it is associated with the calling process and assigned to the current Windows Session. Generally, only a single Windows Station, the Interactive Windows Station, can have a user interface and only one can receive user input. However, multiple Windows Stations can be executed under the same Windows Session. According to one embodiment, the method allows the transmission of screens of these applications while running in multiple non-Interactive Windows Stations, despite the inability to send and receive user input in the traditional manner because only one station may be active at any given time.

In another embodiment, the method includes executing multiple applications of multiple users in separate Windows Desktops, under the same Windows Session and Station. Each Windows Desktop exists within a logon Window Session and has a logical display surface, which can contain objects. At any given time, only one Desktop can be active, and the method allows the transmission of screens of the multiple applications even although they are on separate logical displays and only one can be active at any given time.

Figure 5:
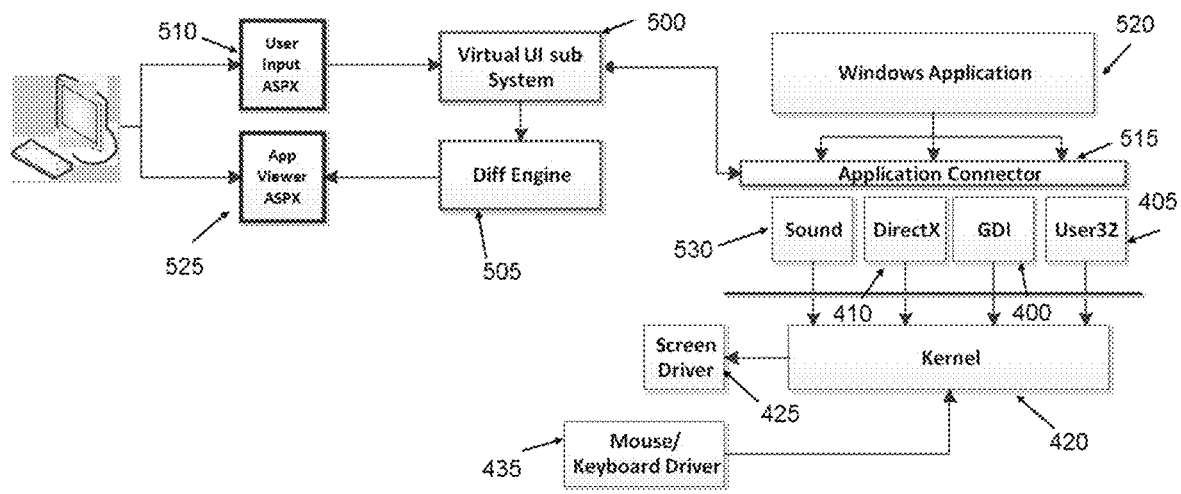
FIG. 5 is a diagram of a system for capturing and transmitting multiple screens and I/O events according to the embodiments disclosed herein.

FIG. 5 is an exemplary and non-limiting diagram of a system for capturing and transmitting multiple screens and I/O events utilized according to the disclosed embodiments. In both of the embodiments discussed above, the applications' screen application programming interface (API) calls, such as GetDC (null), are captured and passed to a virtual user interface (UI) subsystem 500. The virtual UI subsystem 500 provides an application virtual window for a screen capture differential (diff) engine 505. The virtual UI subsystem 500 is also configured to catch and transmit user input events, such as mouse and keyboard events back to the application, instead of using the regular mouse and keyboard drivers. In one embodiment, this may be performed by encoding the user input 510 in an ASPX file, which is used with an ASP.net active server page. Other techniques may be used to encode user input as well.

In addition, the virtual UI subsystem 500 also includes a notification mechanism that can notify an application connector 515 about user input events or any other changes that happened on the virtual screen. Therefore, according to one embodiment, instead of constantly polling for an application's changes, the application connector 515 is configured to listen to the object and gets notified only when such I/O events and screen changes actually occur. The object may be, but is not limited to, a Windows Application 520. Thus, the virtual UI subsystem 500 provides an optimized method to capture screen changes and I/O events from the application 520, a process that is more efficient and with lower resources consumption than constant polling of the application would be.

Once the application connector 515 is informed of a relevant change, the relevant information is transmitted to the virtual UI subsystem 500, which provides the information to the diff engine 505. The diff engine 505 then is configured to process the data to determine which information, if any, should be reported to the user, and to provide such information to an application (app) viewer 525. As in the case of the user input 510, the app viewer's 525 data may be provided in the form of an ASPX file.

It should be noted that in some embodiments, the diff engine 505 is a portion of the Image-Diff mechanism and method, illustrated in FIG. 6, specifically, the portion of the method used to determine which information, if any, to transmit. In other embodiments, the diff engine simply transmits all data if there is a change in the display. In still other embodiments, the Image-Diff mechanism and method are used to detect and transmit the relevant information.

It should be further noted that, in using the application connector 515 to transmit information to and from the virtual UI 500, the disclosed embodiments bypass the traditional APIs, such as DirectX 410, GDI 400, User32 405 that transmit information through the kernel 420 to the screen driver 425 and the mouse/keyboard drivers 435. Similarly, the sound drivers 530 are bypassed as well. This is possible because the application connector 515 is configured to capture the API calls and hand such calls off to the virtual UI subsystem 500.

It should be appreciated that the non-limiting embodiments disclosed herein enable capturing screens of multiple applications 520 without running additional Windows TS/RDS sessions on the server machine, thus saving the costs of RDS licenses. This can be performed by having the application connector 515 listen to multiple applications and switch between desktops or stations as necessary to transmit and receive necessary information. In these embodiments, utilization of hardware resources (e.g., CPU, memory, Network Interface Cards (NIC), and the like) of the server can be conserved. Therefore, a much larger number of concurrent users and applications on the same server can be supported.

It should be further appreciated that by running applications of different users on different Windows Desktops or Windows Stations, security of the individual users is maintained. The applications are executed in isolated containers that separate GUI windows, thereby providing an additional security layer for these applications.

Some embodiments disclosed include an Image-Diff method providing an efficient way to transfer screen changes over at least HTTP, among other potential protocols. In some embodiments, screen changes are transmitted to the user using a hypertext markup language (HTML) standard, such as HTML5 web standard. Other standards may be used as well.

Figure 6A:
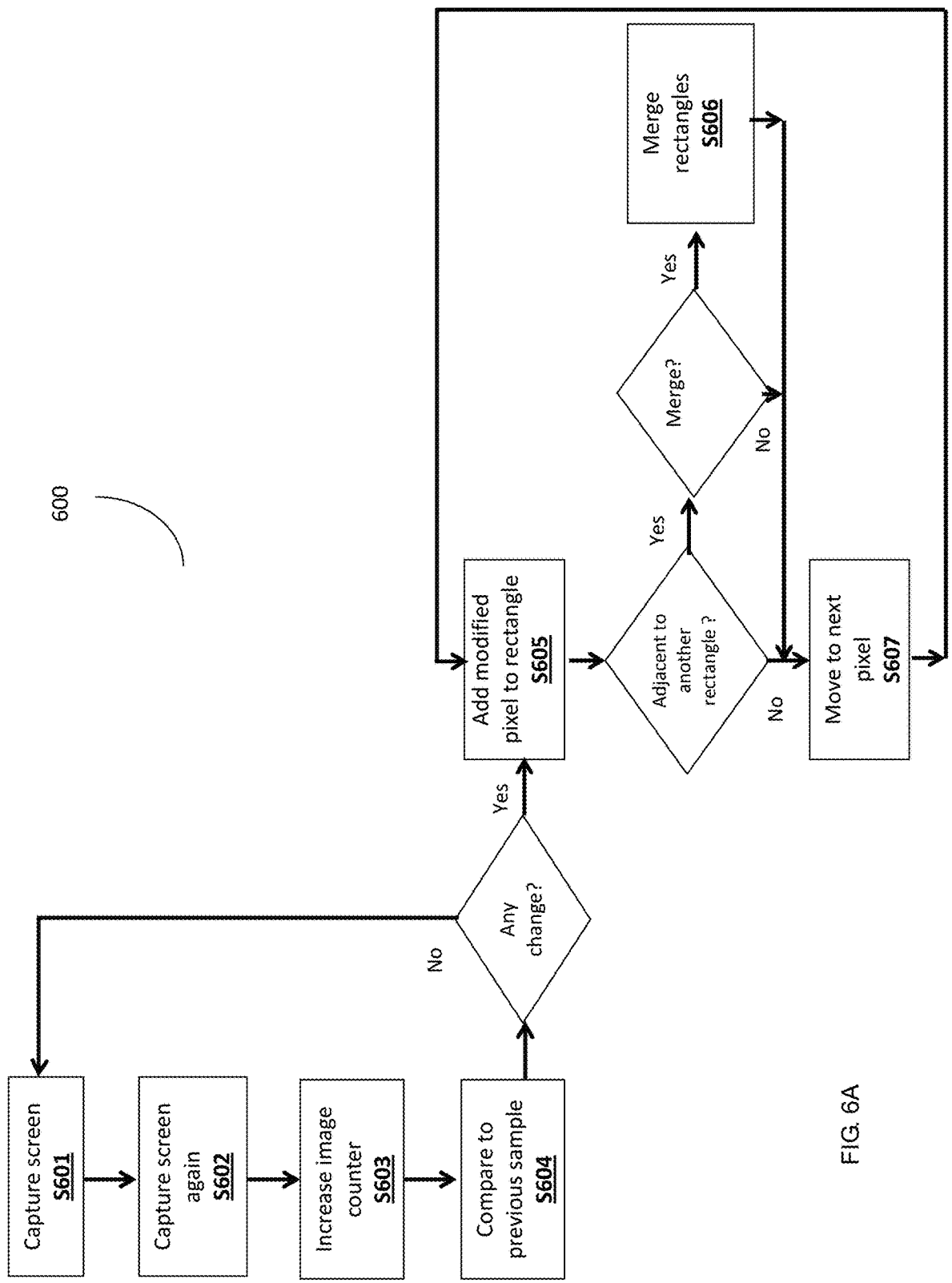
FIGS. 6A and 6B are flowcharts describing an image differentiation method according to one embodiment.

FIG. 6A shows an exemplary and non-limiting flowchart 600 of described an image-differentiation (image-diff) method according to one embodiment. At S601 the current screen rendered by the server executing one or more applications is captured and stored as an image. The image can be in any format including, but not limited to, png, jpg, or any other format that is supported by common web browsers. This image provides a starting point for assessing changes in the screen, and may be transmitted to the user as their initial display.

At S602, the screen is captured again and sampled at predefined time intervals or alternatively upon receipt of a screen change event. Then, at S603 an image counter is increased. The image counter is maintained in the server. After each sampling, at S604, the screen sample is compared with the previous sample in order to detect any pixels that were changed. A changed pixel is defined as any pixel parameter change, such as color, transparency, and so on. If a change was detected between the two samples, execution continues with S605, otherwise, execution returns to S601.

As the changed (modified) pixels are traversed, a single modified pixel is represented as a rectangle at S605. If the next modified pixel is not adjacent, such a pixel is saved again at S605 as a single rectangle. If two or more rectangles that are adjacent to each other (e.g., reside within a predefined radius), such two or more rectangles are merged at S606. The rectangles can be merged in such a way that the new binding rectangle does not intersect with any other rectangle. In another embodiment, the resulted rectangle may include non-modified pixels up to a predefined threshold to minimize the number of overall rectangles to be transmitted to the client machine. The threshold may be defined, for example, as a ratio between modified and unmodified pixels.

As illustrated in FIG. 6A the process for creating rectangles is repeated for each pixel in the sampled screen. This process ends when there are no changes in the sampled screens. The list of rectangles and their contents is then transmitted to the client machine as further discussed in FIG. 6B.

At various points in the process illustrated in FIG. 6A, the method compares the counter updated at S603 to an independent counter kept at the client machine, and monitors the difference for service cutoffs or delays. Cutoffs or delays on the client machine are defined by comparing the difference between the client counter and server counter to a predefined parameter. If the counters differ by more than the relevant parameter, the server takes a complete image of the screen and sends the complete image to the client machine. The server may also do this in order to synchronize the counters.

Figure 6B:
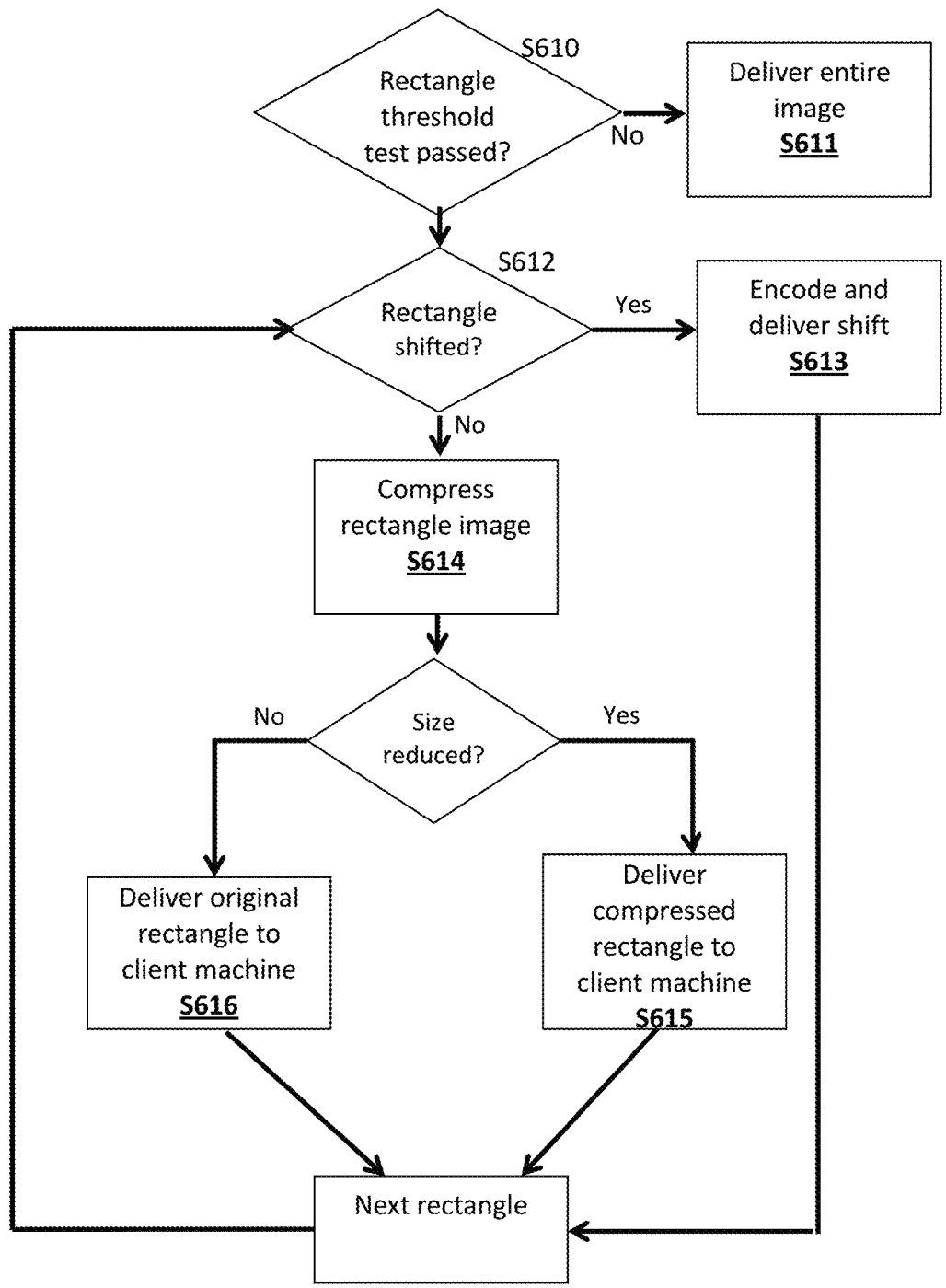

Referring now to FIG. 6B, at S610, a test is performed to determine if the number or details of the changes are above a predefined threshold. If so, at S611, a full image of the screen displayed over the server executing the application is taken, saved, and delivered to the client machine.

At S612, another test is performed to determine if the rectangle constitutes a vertical or horizontal shift from a previous captured image or rectangle, and if so at S613, the shifted rectangle is encoded and delivered to the client machine. Otherwise, execution continues with S614. In one embodiment, S613 includes detecting a horizontal shift and/or a vertical shift between two rectangles. The shift, either vertical or horizontal, may be encoded as an offset vector and rectangle coordinates.

At S614 an attempt is made to compress the rectangle (for instance into a jpg image). If the compression reduces the image size above a predefined threshold, at S615, the compressed rectangle is delivered to the client machine, e.g., a handheld device. Otherwise, at S616 the original non-compressed rectangle is delivered to the client machine. Substantially simultaneously with the saving of the one or more rectangles and delivery to the client machine, the method continues to process new samples by returning to S602. If there are no new samples to process the method ends.

In one embodiment, the compression of rectangles may include identifying a uniform color rectangle and encoding such a rectangle as a coordinate and color value vector rather than transmitting each individual pixel contained within the rectangle. Small rectangles may also be encoded as, for example, as HTML Base64 objects for faster rendering on web browsers.

It should be noted that the image-diff method disclosed herein can support multiple users with different start time and different bandwidth characteristics.

Figure 7:
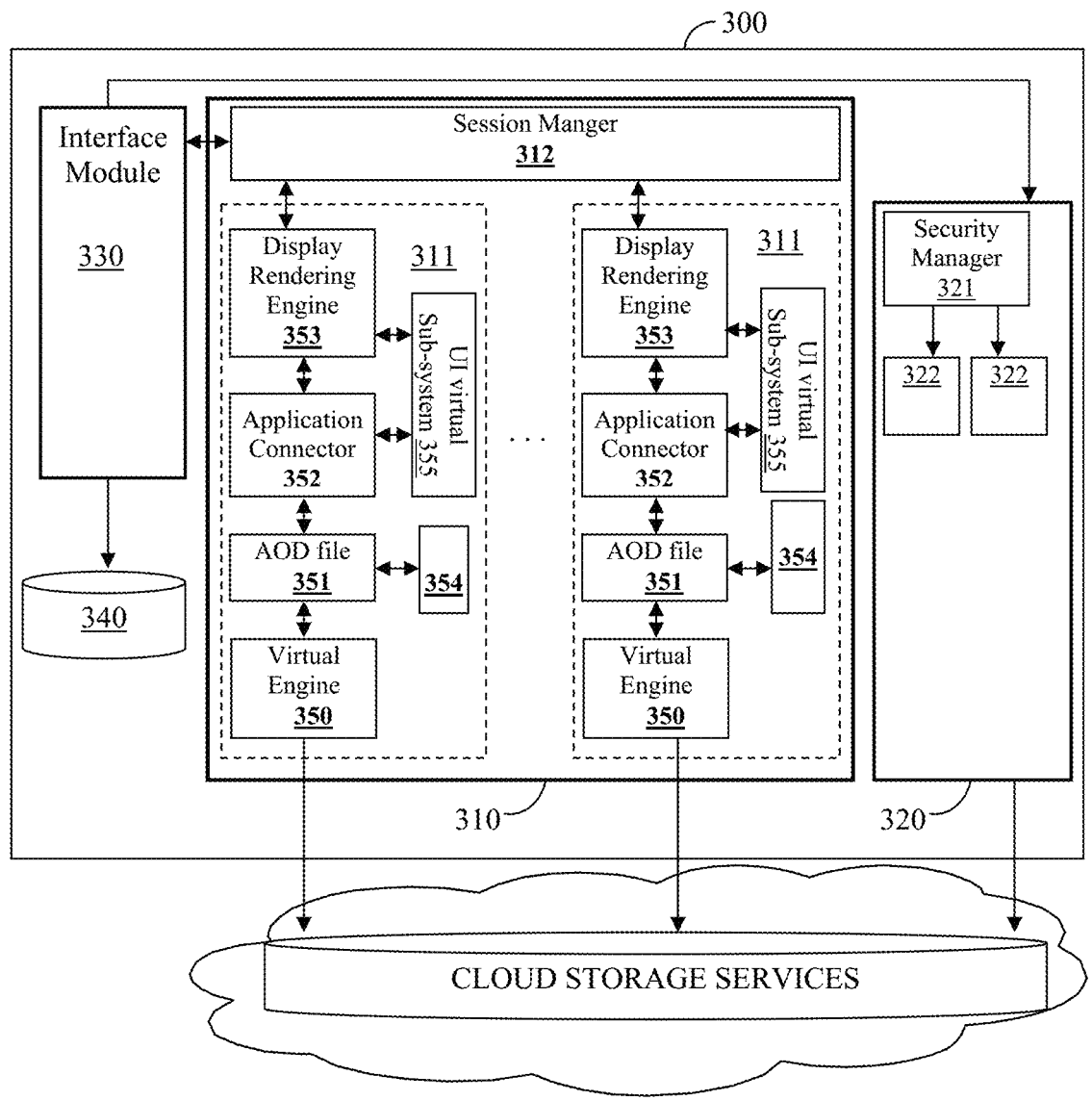
FIG. 7 is a block diagram of a server executing a cloudified application and a computing application as well as transmitting the screens captured that can be utilized for the disclosed embodiments.

The embodiments disclosed herein can be realized by a rendering engine included in a server 300 shown in the exemplary and non-limiting FIG. 7. The server 300 enables the execution of legacy applications across different types of operating systems. To this end, the server 300 is configured to run a cloudified application corresponding to a legacy application in conjunction with a user's computing device. It should be noted that the cloudified application allows the server 300 to run an application that would not have been executed if it was natively installed on a server.

The server 300 includes a session module 310, a cloud storage module 320, an interface module 330, and a database 340. The session module 310, for each cloudified application executed by the server 300, creates, manages, and terminates HTTP sessions with one or more computing devices.

The cloud storage module 320 interfaces between cloudified applications and the one or more cloud storage services of users and authenticates the computing devices to allow access to such services. The cloud storage services are provided by third party vendors, such as Dropbox™, Box.net and Amazon® S3. In one embodiment, the cloud storage module 320 includes a security manager 321 that provides authentication services to the interface module 330.

The security manager 321 receives from the module 330 a name of a cloud storage service, a username and a password to access the service, and determines if the user is authorized to access the requested service. The cloud storage module 320 also includes a plurality of plug-ins 322, each of which interface with a different cloud storage provider. A cloud plug-in is an abstract file manager layer that allows the interface module 330 to perform file system operations in the cloud storage service.

The cloud storage module 320 is configured to receive, as an input from interface module 330, a required cloud storage service (e.g., Box.net), and the username and password.

Then, plug-in 322 corresponding to the requested cloud service is initiated and authentication of the user's credentials against the service provider is performed to obtain a connection Token. The cloud storage module 320 may contain multiple plug-ins 322 corresponding to multiple cloud storage services. Once a connection is established with the cloud storage service, file system operations can be performed on the cloud storage service's operating system directly. Such operations include, for example, folder drill down, file open, file save, and so on.

The interface module 330 is configured to interface between each cloudified application executed by the session module 310, and the respective mobile application run by the computing device. To this end, the interface module 330 is configured to transmit a mobile application's inputs from the computing device to the server 300 and outputs (e.g., screen changes) rendered by the session module 310 to the computing device. In addition, the interface module 330 may provide a view to the various cloud storage services. That is, when a certain cloud storage service is accessed by a cloudified application, the exact same GUI of the accessed service is rendered by the interface module 330 to be displayed by the mobile application on the computing device. As mentioned above, an access to a cloud storage service is performed through the cloud storage module 320.

The database 340 includes users' credentials for using each of the cloudified applications and for accessing their cloud storage services. In certain implementations, the database 340 may be a standalone system connected to the server 300.

The session module 310 includes a plurality of sessions 311, each of which is an instance of a cloudified application and a session manager 312 acting as a proxy between the interface module 330 and the sessions 311. When a user launches a mobile application respective of a cloudified application, the session manager 312 assigns a unique session identification (ID) number and allocates a new session to the user's computing device. Each session 311 includes a virtual engine 350, an AOD file 351, an application connector 352, a display rendering engine 353, and a user data file 354.

The virtual engines 350, AOD file 351, and user data file 354 are elements of the cloudified application. The virtual engine 350 executes the cloudified application based on the application's resources and user data contained in the AOD and user data files 351 and 354. The virtual engine 350 executes the application in a sealed environment over the host operating system (not shown) of the server 300. That is, a cloudified application executed by the virtual engine 350 of one session can share hardware resources of the server 300 with other sessions, but one session, hence a virtual engine 350, cannot access other sessions concurrently running over the server 300.

The virtual engine 350 also interacts directly with one or more of cloud storage services to perform file system operations. The application connector 352 handles the standard input/output tasks for an executed cloudified application. For different cloudified applications, different application connectors are provided.

Figure 2A:
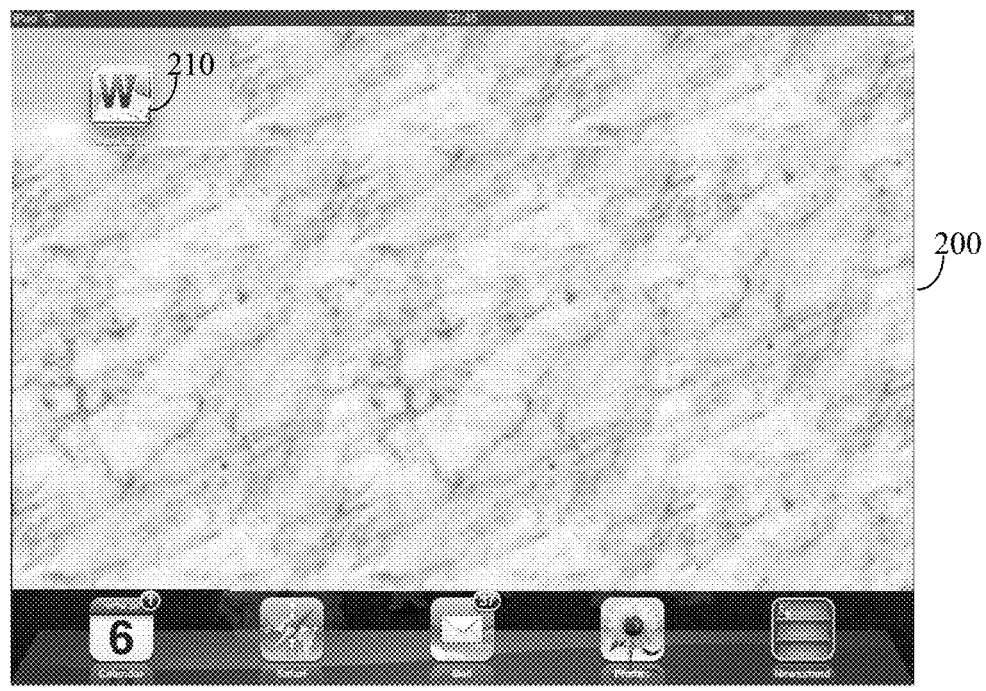
FIGS. 2A, 2B, and 2C are exemplary screen shots rendered and displayed over a mobile client device.
Figure 2B:
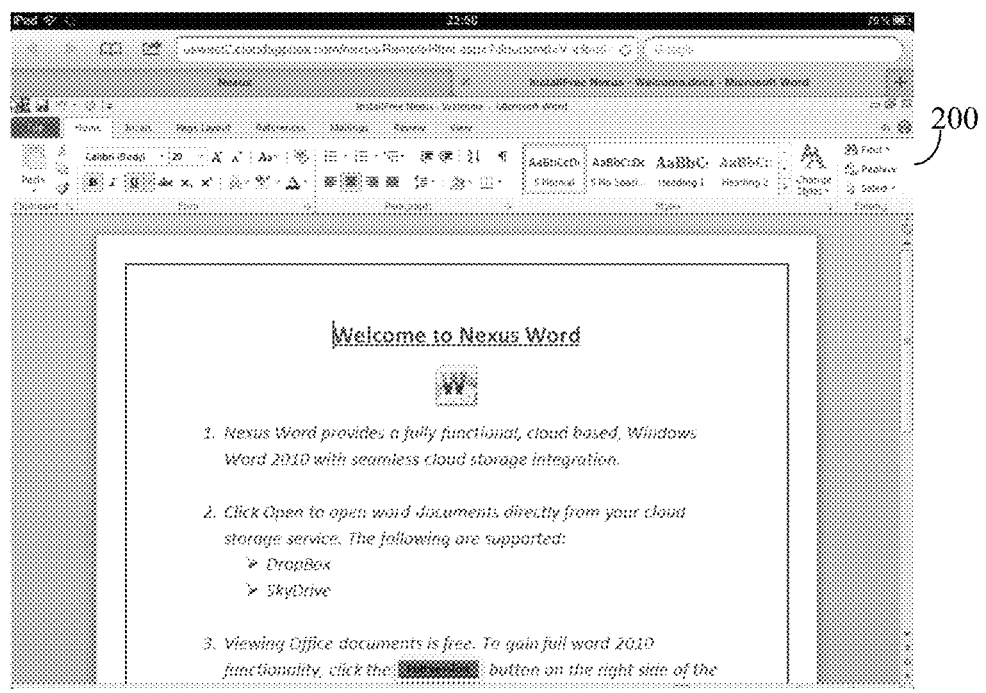
Figure 2C:
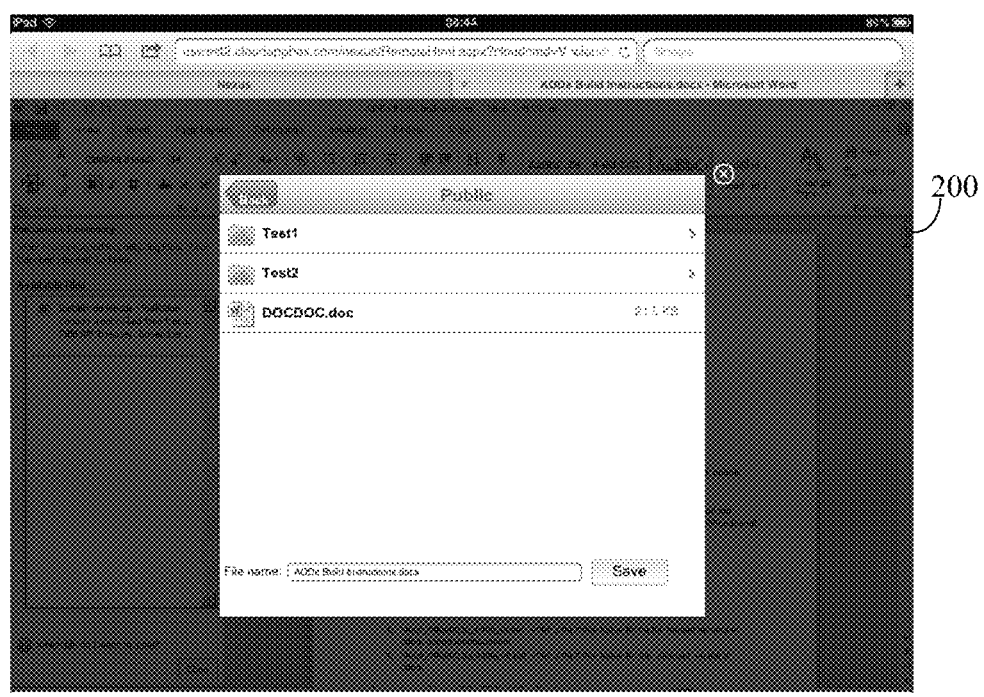
Figure 3:
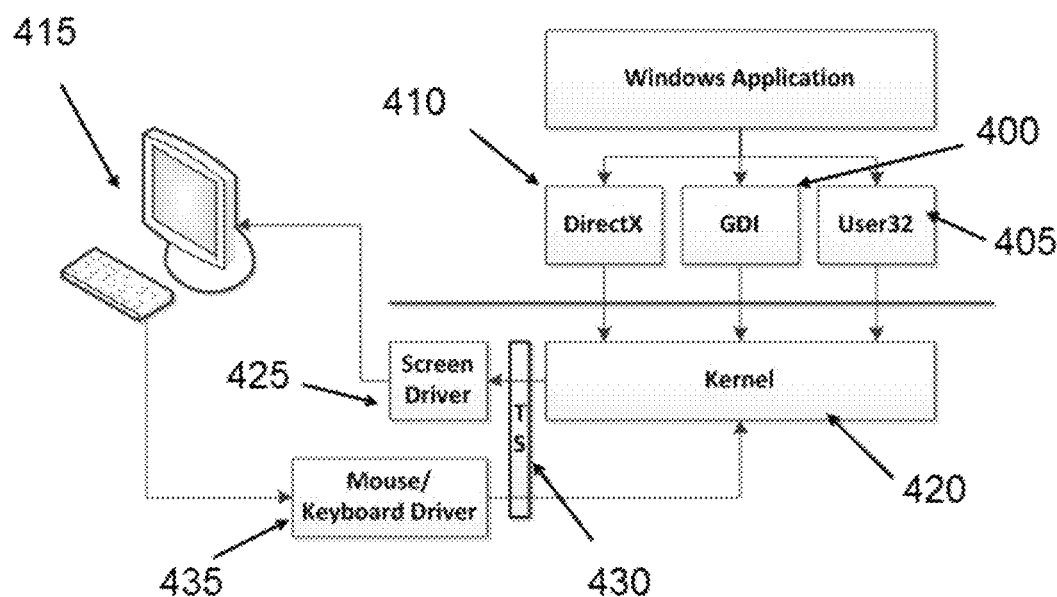
FIG. 3 is a diagram of a system for capturing of screens and I/O events of terminal services (TS).
Figure 4:
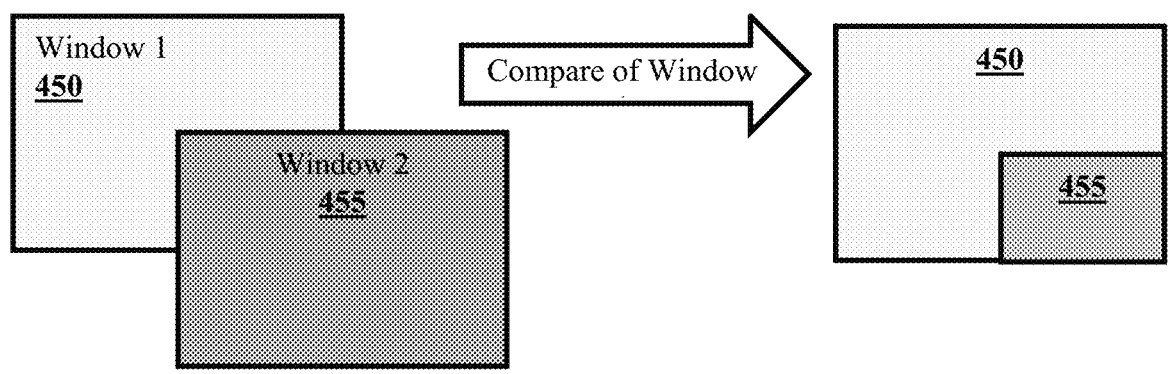
FIG. 4 is a diagram illustrating the problems of capturing multiple screens using terminal services (TS).

The display rendering engine 353 generates the screen's bitmaps to be displayed on the user's computing device display. Examples for such bitmaps are provided in FIGS. 2B and 2C discussed above. The bitmaps are the outputs resulting from executing the cloudified application in response to the user's inputs. According to one embodiment, the rendering engine 353 renders only the bitmaps according to the image-diff method described above and shown in FIG. 6. The bitmaps and/or their differences are streamed to the computing devices by the interface module 330. The rendering engine 353 is also connected to a virtual UI subsystem 355, such as virtual UI, discussed in detail above.

The various embodiments disclosed herein may be implemented as hardware, firmware, software or any combination thereof. Moreover, the software is preferably implemented as an application program tangibly embodied on a program storage unit or non-transitory computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A non-transitory computer readable medium storing instructions which, when executed by a processing unit, configure a server:

to transmit, to a client device, a screen output rendered by a first rendering engine of the server respective of a first instance of a first application, the first rendering engine rendering the screen output based on data received from a first virtual user interface (UI) subsystem, the first virtual UI subsystem configured to receive, from a first application connector, information relevant to a change in screen content associated with the first instance of the first application; and to transmit, to the client device, the screen output rendered by a second rendering engine of the server respective of a second instance of a second application, the second rendering engine rendering the screen output based on data received from a second virtual UI subsystem, the second virtual UI subsystem configured to receive, from a second application connector, information relevant to a change in screen content associated with the second instance of the second application, wherein the first instance is contained in a first securable object associated with the first application and the second instance is contained in a second securable object associated with the second application, wherein the first instance and the second instance are executed by the server under a single logon session.

2. The non-transitory computer readable medium of claim 1, wherein the first securable object is a first non-interactive Windows Station and the second securable object is a second non-interactive Windows Station.

3. The non-transitory computer readable medium of claim 2, wherein the first application and the second application are the same application.

4. The non-transitory computer readable medium of claim 2, wherein the first and second non-interactive Windows Stations are isolated from each other.

5. The non-transitory computer readable medium of claim 1, wherein the instructions, when executed by the processing unit, further configure the server:
   to receive notifications from the client device about input events triggering screen changes, wherein the input events include any one of mouse movements and keyboard inputs.

6. The non-transitory computer readable medium of claim 1, wherein the transmission of the screen content to the client device is performed over a hypertext transfer protocol (HTTP).

7. The non-transitory computer readable medium of claim 1, wherein the transmission of the screen content to the client device is performed over a secured hypertext transfer protocol (HTTPS).

8. The non-transitory computer readable medium of claim 1, the instructions, when executed by the processing unit, further configure the server:
   to transmit image differences between iterations of the screen content captured at a first time and a second time.

9. The non-transitory computer readable medium of claim 8, the instructions, when executed by the processing unit, further configure the server:
   to transmit modified pixels as an array of non-intersecting rectangles, wherein each of the non-intersecting rectangles bounds all pixels modified between a first image and a second image respective of the screen content captured at the first time and the second time.

10. The non-transitory computer readable medium of claim 9, wherein a single modified pixel with no adjacent modified pixel is represented as a single rectangle to be transmitted; wherein at least two adjacent modified pixels are represented as a single rectangle to be transmitted; wherein pixels that are not adjacent are each represented as standalone rectangles to be transmitted; and wherein if the number of rectangles required exceeds a predetermined threshold, a full screen image is taken.

11. The non-transitory computer readable medium of claim 9, wherein one or more non-intersecting rectangles contain a number of unmodified pixels.

12. The non-transitory computer readable medium of claim 9, the instructions, when executed by the processing unit, further configure the server:
   to detect at least one of a horizontal shift and a vertical shift between the first image and the second image; and
   to encode the changed shift as an offset vector and rectangle coordinates.

13. The non-transitory computer readable medium of claim 8, wherein the content of each of the non-intersecting rectangle is further compressed.

14. The non-transitory computer readable medium of claim 8, wherein a rectangle of the non-intersecting rectangles containing a uniform color is encoded as the rectangle coordinates and value of the color only.

15. The non-transitory computer readable medium of claim 8, wherein a rectangle under a certain size threshold is encoded as an HTML Base64 object.

16. The non-transitory computer readable medium of claim 1, wherein the first application is a virtualized cloud version of a first legacy application and the second application is a virtualized cloud version of a second legacy application.

17. The non-transitory computer readable medium of claim 16, wherein the screen outputs are rendered using at least an HTML5 web standard.

18. The non-transitory computer readable medium of claim 1, wherein the first securable object is a first Windows Desktop contained in a first Windows Station and rendered on a first logical display; and the second securable object is a second Windows Desktop contained in a second Windows Station rendered on a second logical display.

* * * * *